United States Patent [19]

Dyson et al.

[11] 4,218,480
[45] Aug. 19, 1980

[54] PRODUCTION OF PARTICULATED STALE BREAD

[75] Inventors: David V. Dyson, Richmond Hill; Kenneth S. Darley, Whitby; Michael A. F. Fenn, Ajax, all of Canada

[73] Assignee: The Griffith Laboratories, Limited, Scarborough, Canada

[21] Appl. No.: 366

[22] Filed: Dec. 29, 1978

[51] Int. Cl.$^2$ ............................................. A21D 6/00
[52] U.S. Cl. ..................................... 426/19; 426/241; 426/498; 426/549
[58] Field of Search ................. 426/19, 549, 498, 240, 426/243, 244, 241

[56] References Cited

U.S. PATENT DOCUMENTS

| | | | |
|---|---|---|---|
| 3,041,176 | 6/1962 | Baker | 426/498 |
| 3,424,590 | 1/1969 | Booras | 426/244 |
| 3,870,803 | 3/1975 | Siems et al. | 426/128 |

Primary Examiner—Raymond N. Jones
Assistant Examiner—Elizabeth A. Hatcher
Attorney, Agent, or Firm—Sim & McBurney

[57] ABSTRACT

Stale, coherent and friable bread crumbs and croutons are produced by a continuous multistage operation which does not require a separate staling step. Bread forming components are mixed in a continuous mixer under critically-controlled conditions and carbon dioxide or other gas is injected into the mixed components at a plurality of locations along the length of the mixer. The dough resulting from the mixer is subjected to baking and the baked product, usually after relatively rapid cooling, is comminuted to the required particle size. Flavor and textuere may be introduced using a yeast and enzyme ferment.

15 Claims, No Drawings

PRODUCTION OF PARTICULATED STALE BREAD

FIELD OF INVENTION

The present invention relates to the manufacture of particulated stale bread, especially bread crumbs and croutons.

BACKGROUND TO THE INVENTION

Bread particles, in the form of crumbs and croutons, are used in a variety of food products, for example, fish coatings, chicken coatings, onion rings, meat patties, stuffing mixes, and as garnishes. The bread particles are generally produced by baking bread according to conventional yeast leavening procedures, allowing the bread to stale and then comminuting the stale loaf to the desired particle size. The time required for staling is normally about 1 to 3 days, necessitating a large storage space for the loaves while staling occurs, and the rehandling of the same, with interrupted unit processes thus being involved.

It has previously been suggested to utilize added gaseous materials, such as, carbon dioxide, for leavening of bread in place of yeast leavening. The use of continuous mixers in combination with added gaseous materials also has been described, for example, in U.S. Pat. No. 3,041,176 to Baker. In the latter patent, flour and water are premixed to form a slurry, the slurry is transferred by a supply hopper and a pump to a continuous mixer to which gas is introduced to form a continuous dough. The introduced gas is said by this patent to be used to raise the dough in subsequent baking to avoid the use of any yeast or ferment.

While the latter procedure is useful in decreasing substantially the overall baking time for a bread product, as compared to conventional procedures, the premixing of the components to form a slurry is time consuming and the total exclusion of yeast or other ferments prevents the use of the flavour and texture enhancing properties thereof.

SUMMARY OF INVENTION

The present invention provides an improved procedure for the manufacture of particulated stale bread, of characteristics comparable to those of conventional stale bread particles, which enables such particulated stale bread to be produced on a continuous basis, without the necessity of the prior art staling storage period mentioned above, and the problems resulting therefrom.

The process of the present invention involves a multistage substantially continuous procedure, which comprises continuous mixing of bread-making components and carbon dioxide or other gas, or mixture of gases under critical conditions, defined hereinafter, to form a gas-leavened partially-cooked dough, expanding and baking of the dough to result in a baked bread product which has the characteristics of a staled bread, and comminuting the bread product to the desired particle size. The overall procedure involves only a short period of time, when compared to conventional baking processes and staling procedures.

GENERAL DESCRIPTION OF INVENTION

The bread particles which are produced in this invention have certain characteristics which render them desirable for a variety of end uses. The particles may have any desired particle size and usually either characteristic of croutons or characteristic of bread crumbs. The particles have a stable integral coherent shape and general lack of softness and stickiness, resulting from the stale nature of the bread, an opaque appearance resulting from the partially retrograded nature of the starch, are friable, a density of about 11 to about 24 lb/cu.ft. resulting from the porosity of the particles and to some extent, the size of the individual particles, a water absorption capability of about 2.5 to about 4 times its own weight, and a shear value of about 18 to about 49 kg.

The initial bread-forming ingredients used in the process may comprise any of the components conventionally used in bread making and itemized under the Standards of Identity, FDA Regulations 21 C.F.R. 136.110 to 0.180 inclusive. The basic components of any dough are flour and water, the term "flour" including farinaceous flours used alone or in combination with other flours and meals, such as, the permitted materials outlined in 21 C.F.R. 137.105 to 0.350 inclusive, as well as those of legumes, rye, sorghum and rice.

Varying quantities of dough-forming components may be used, usually including sugar and salt in varying proportions, depending on the characteristics desired in the product and the flour used. Other bread-forming components which may be used include shortening for texture improvement, and oxidizing, maturing and improving agents, such as, potassium bromate, azodicarbonamide, cysteine hydrochloride and ascorbic acid.

Yeast, and amylolytic or proteolytic enzymes also may be included, to modify texture and flavour in the product, as described in more detail below. Emulsifiers and cell-wall improvers may be used.

Yeast is conventionally used for leavening purposes in bread-making. In this invention, yeast may be used, as a flavour enhancer rather than for leavening purposes, leavening in this invention being achieved by the use of gaseous materials, such as, carbon dioxide, nitrogen, air, or mixtures of gases.

As mentioned above, the various proportions of the dough-forming ingredients depend on the properties desired, the flour used and also on the nature and choice of the components. One suitable composition of ingredients, exclusive of water, which is utilized, in this invention, as a dry mix, includes:

| Flour | 100 parts by weight |
|---|---|
| Sugar | up to about 5% by weight of flour |
| Salt | up to about 5% by weight of flour |

In addition, one or more of the following optional components may be present, based on the weight of flour:

| Yeast | 0 to about 4% by weight |
|---|---|
| Mono and/or diglycerides | 0 to about 2% by weight |
| Hydrolyzed wheat starch | 0 to about 5% by weight |
| "Tween" surfactant | 0 to about 0.75% by weight |
| Shortening | 0 to about 8% by weight |

Another suitable composition of ingredients also used as a dry mix in this invention, utilizing a mixture of flours, may comprise:

| | |
|---|---|
| Wheat flour | 75 parts by weight |
| Rye flour | 25 parts by weight |
| Sugar | up to about 5% by weight of total flour |
| Salt | up to about 4% by weight of total flour |

In addition, one or more of the following optional components may be present, based on the weight of flour:

| | |
|---|---|
| Yeast | 0 to about 4% by weight |
| Shortening | 0 to about 8% by weight |
| Yeast food | 0.2 to about 0.35% by weight, when yeast is present |
| Protease | about 25,000 to about 85,000 H.U. per 100 lb. flour, when yeast is present. |

Products produced from the preceding compositions, while useful in certain end uses, are somewhat bland in taste and lack the characteristic bread taste. In this invention, flavour-enhancing and texture-modifying premixes are used in a unique way to control the end flavour and texture. A concentrated brew is used containing a minor proportion of the flour (usually less than 20% by weight of the total), a major proportion of the inlet moisture (usually 50 to 70% by weight), and yeast, amylolytic enzyme and proteolytic enzyme.

The brew is subjected to a short and intense fermentation, usually for about one hour, which, combined with the very short mixing time, does not permit the generation of antistaling components. In this way, yeast and other desirable flavour enhancers and texture modifiers may be introduced to the bread mix without also introducing antistaling components.

Preferred brew mixes for use in this embodiment of the invention may be formed by providing an initial yeast suspension comprising, based on the weight of total flour:

| | |
|---|---|
| Yeast | about 2 to about 4% by weight |
| Sugar | about 0.05 to about 0.1% by weight |
| Water | about 10 to about 12% by weight |

This suspension is fermented for about 15 to about 60 minutes at a temperature of about 85° to about 105° F. and the fermented suspension is mixed with a liquid enzyme mixture comprising, based on the weight of total flour:

| | |
|---|---|
| Amylolytic enzyme | about 1250 to about 6000 SKB units/100 lb. flour, and/or |
| Proteolytic enzyme | about 25,000 to about 85,000 H.U./ 100 lb. flour |
| Yeast food | about 0.25 to about 0.32% by weight |
| Sugar | about 1 to about 5% by weight |
| Water | about 30 to about 35% by weight |
| Flour | about 5 to about 20% by weight |

The resulting brew is fermented at a temperature of about 75° to about 105° F. for about 30 to about 90 minutes.

The fermented brew is used in this embodiment in association with such additional water as may be required to provide the desired overall moisture content and with a dry mix comprising, by weight of total flour:

| | |
|---|---|
| Flour | about 80 to about 95% by weight |
| Salt | about 1.0 to about 3.5% by weight |
| Shortening | 0 to about 8% by weight. |

In the process of this invention, the bread-forming ingredients are fed to inlets at one end of a continuous mixing zone capable of plug flow therethrough. The mixing zone may take the form of an elongate screw-type mixer-extruder, suitably modified to provide the required processing conditions therein. The bread-forming ingredients are fed to one end of the mixer in relative proportions suitable to provide an overall moisture content of intermixed components of about 38 to about 50% by weight, preferably about 42 to about 45% by weight. The dry mix, water, and any flavour enhancing ferment, are usually separately fed to the mixer.

Within the mixing zone, the bread-forming ingredients are continuously intermixed while they are conveyed from one end of the mixing zone to the other, over a time period of about 20 to about 180 seconds, preferably about 30 to about 60 seconds.

A plurality of spaced gaseous inlets is provided along the length of the mixing zone and a gaseous material, or mixture of gaseous materials, is injected into the mix through the openings. Carbon dioxide usually is used, often in admixture with nitrogen, as the gaseous material, although other materials may be used, including air and oxygen. The total gas fed to the mixing zone is in the range of about 1.3 to about 30 SCFH, preferably about 10 to about 12 SCFH, per 100 lbs. of dough.

The bread forming components and the injected gas are subjected to high shear forces within the mixing zone, sufficient to cause simultaneous uniform mixing of the components and dispersion of the inert gas throughout the mix. The work done on the dough within the mixing zone varies from about 7.5 to about 20 watt hr/lb of dough, preferably about 12 to about 16 watt hr/lb.

The mix of bread-forming components and inert gas usually is heated within the mixing zone for at least a major proportion, typically about 75%, of the length of the mixing zone to cause partial gelation of starch material contained in the bread-forming components. The temperature in the mixing zone is maintained sufficiently high that the heat applied combined with that resulting from the high shear mixing results in a dough emerging from the mixing zone having a temperature of about 90° to about 130° F., preferably about 105° to about 120° F., to achieve the partial gelation.

The dough resulting from the operations in the mixing zone is extruded therefrom under a back pressure which is usually in the range of about 50 to about 500 psig, and is preferably a relatively low back pressure in the range of about 75 to about 120 psig, achieved by suitable design of the extrusion nozzle. The mixing and heating operations effected in the mixing zone are controlled by the above-described parameters to result in an extruded dough having a viscosity comparable to that achieved from a conventional procedure.

The operations effected in this way in the mixing zone ensure that the final bread product will be stale, that is, the material lacks the softness and stickiness characteristics of fresh bread, and no holding time is required at any stage of the process.

The dough-forming operation used in this invention contrasts markedly with the procedure outlined in the Baker patent referred to above. In this invention, the flour and water are separately fed directly to the mixer, the bread-forming components are conveyed in plug flow manner through the mixing zone while leavening gas is injected into the mix at a plurality of spaced locations, the flour, water and gas are thoroughly intermixed under critical high shear, temperature and back pressure conditions, and the dough-forming process is rapidly completed.

In the operation in the Baker patent, the flour and water are first thoroughly intermixed, the intermixing with a single gas feed occurs in a tumbler mixer through which the components do not pass in plug flow manner, and the work applied is considerably less than in the invention. These differences result in much longer mixing times, of the order of 15 minutes. The Baker patent does not indicate the direct formation of a stale product.

In a preferred embodiment of the present invention, the very short overall mixing time permits direct control to be exercised over the flavour and texture of the final product, by the use of a yeast-based brew mix added directly to the mixer at the upstream end. The fermentation period is critically-controlled to prevent the formation of other than small quantities of antistaling agents and the mixing time in the continuous mixer does not extend this period significantly. The preferred embodiment of the present invention, therefore, is able to achieve a leavened dough by the use of externally-added gases while at the same time using yeast and other enzymes to produce enhanced flavour and texture without also producing antistaling agents. The latter preferred operation may be compared with the disclosure of the Baker patent where the total absence of fermentation components is emphasized.

The dough formed by the above-described mixing procedure is extruded from the mixing zone as a continuous tow, which generally has a transverse dimension of about 2 to about 4 inches.

The tow may be separated into loaf-like lengths, for example, about 2 to about 9 inches long, or larger loaf sizes, prior to baking, or may be baked as a continuous tow in a continuous oven, as desired. It is preferred to effect baking of the continuous tow in a continuous oven to maintain a continuous throughput.

Baking of the dough may be effected using any convenient form of electromagnetic radiation, for example, microwave baking, conventional infra-red oven baking, or a sequential combination of the two techniques. The choice of the baking method may result in differing end properties, such as, varied porosity, with microwave baking generally resulting in a higher porosity product than infra-red baking. Infra-red oven baked products usually are surface browned and have more flavour as opposed to microwave-baked products which remain white and have less flavour.

Oven baking may be effected in the range of about 375° F. to about 475° F., for a time sufficient to result in a dough temperature of about 180° to about 215° F., preferably about 200° to about 210° F., generally in about 15 to about 25 minutes, typical baking conditions being 410° F. for 20 minutes.

When microwave baking is effected, the microwave energy input may vary from about 1.4 to about 9 kw min/lb of dough, preferably about 1.8 to about 3.6 kw min/lb of dough, for a time sufficient to result in an internal dough temperature of about 180° to about 215° F., preferably about 200° to about 210° F.

During the microwave baking an air flow is maintained to remove moisture evaporated in the baking process, generally at a temperature of about 200° to about 500° F., preferably about 250° to about 350° F. Moisture loss during the microwave baking varies from about 2 to about 20%, preferably about 3 to about 10%, by weight of the total dough weight.

The dough next is baked, either in a conventional infra-red heating oven or in a microwave heating oven, to the desired doneness of product, preferably by conveying the dough through the oven.

The baked dough is usually quickly cooled in a continuous manner, typically in approximately one hour, and, after cooling, the baked product is comminuted to the desired particle size. The particles then may be dried and packaged.

It may be desired to effect comminution at a remote location from or at a subsequent time to the formation of the baked stale bread. However, it is preferred to effect the comminution immediately after cooling, although this step may be effected prior to cooling, if desired.

The particle size to which the bread is comminuted depends upon the intended end use of the particles. For example, the bread may be comminuted to $\frac{1}{4}$ to $\frac{1}{2}$ inch cube-like pieces, for use as croutons, or may be comminuted to small crumb-like size, i.e., all the particles pass $\frac{1}{2}$ mesh (U.S. Standard) screen but are all retained on a 20 mesh screen, with $\frac{1}{2}$ being retained on an 8-mesh screen. An alternative crumb may be provided in which all the particles pass a 30-mesh screen and 25% of the particles pass a 100-mesh screen.

The whole particulated stale bread-forming procedure may be operated, therefore, on a continuous basis and requires no holding time for dough fermentation or proofing, as is required in yeast leavened conventional bread products, or baked product if comminuted immediately, therby enabling the product to be produced in a relatively short overall time period from commencement of mixing in the mixing zone to packaging of final product, typically about 2 hours.

EXAMPLES

Example 1

An initial dry mix containing the following ingredients was prepared:

| Component | Parts by Weight |
| --- | --- |
| Flour | 100 |
| Sugar | 2.0 |
| Salt | 1.5 |
| Yeast | 2.0 |
| Maltrin[1] | 3.0 |
| Tween 60[2] | 0.25 |
| Shortening | 2.0 |

Notes:
[1] Maltrin is a hydrolyzed wheat starch
[2] Tween 60 is a non-ionic surfactant The dry mix was fed into one end of an extruder at a rate of 15 lb/min while water was also fed into the one end of the extruder at a rate of 8 lb/min, (corresponding to a moisture content of about 43%).

The components were continuously intermixed during passage from one end of the extruder to the other over a period of about 35 seconds. Carbon dioxide was fed into the extruder at six different locations along the length of the extruder at a rate of 12.3 SCFH/100 lb. dough while the extruder was heated to result in a dough having a temperature of 120° F. at the exit of the extruder. Work was applied to the dough during formation thereof and passage through the extruder of 10.3 watt hr/lb. of dough and a back pressure of 120 psig existed at the extruder outlet orifice.

A continuous dough tow of about 3 inches diameter was extruded from the extruder and subjected to microwave cooking in a continuous microwave oven. The dough was subjected to microwave energy at an energy input of 4.0 kw min/lb dough while a flow of air at a temperature of about 250° F. was passed through the oven to remove moisture. The microwave cooking was effected to result in a moisture loss from the dough of about 10% by weight and an internal temperature at the oven exit of about 200° F. The resulting dough was cut into convenient lengths as it passed out of the microwave oven, cooled and comminuted to crumbs.

In a parallel experiment, in place of the microwave oven, a conventional baking oven was used wherein the dough tow was baked at 410° F. for 25 minutes. The resulting product again was cooled and comminuted to form croutons.

In each case, the product was stale, opaque, friable and coherent, the microwave baked product being white and the oven baked product being browned. The physical properties of the comminuted product were determined in each case, and are reproduced in the following Table I:

TABLE I

| Property | Value | |
|---|---|---|
| | Microwave | Oven |
| Density (lb/cu.ft.) | 18 | 20 |
| Absorption capacity (times own weight) | 2.6 | 2.8 |
| Shear value (kg) | 43 | 36.4 |

Example II

Three separate compositions were prepared, a dry mix, a yeast suspension and a liquid brew. The compositions had the following constitutions:

| (a) Dry Feed: | |
|---|---|
| Flour | 86 lb |
| Shortening | 1.9 lb |
| Seasoning (salt) | 3.2 lb |
| (b) Yeast suspension: | |
| Bulk granular yeast | 3.2 lb |
| Cane sugar | 0.06 lb |
| Water | 10.1 lb |
| (c) Liquid brew | |
| Yeast food | 0.28 lb |
| Amylase | 3840 SKB Units |
| Wheat flour | 11 lb |
| Cane sugar | 1.1 lb |
| Protease | 28,000 H.U. |
| Water | 29.1 lb |

The yeast suspension was activated 30 minutes prior to commencement of brew ferment. The liquid brew was mixed with the yeast suspension and fermented at 104° F. for 60 minutes.

The dry mix, brew mix and additional water were fed to one end of the extruder, the brew mix being added shortly downstream of the dry mix and water, at the following feed rates:

| Dry feed | 15 lb/min |
|---|---|
| Water | 2.05 lb/min |
| Brew mix | 9.0 lb/min |

The extruder was operated as described in Example I, under the following conditions:

| Mixing time | about 35 seconds |
|---|---|
| Dough exit temperature | 110° F. |
| Gas inlet flow | 10 SCFH/100 lb dough |
| Work applied | 14 watt hr/lb |
| Extruder back pressure | 75 psig |

A continuous dough tow of 3 inches diameter was extruded from the extruder and subjected to baking. In one instance, microwave baking was used while in another, baking at 410° F. for 20 minutes was used. The conditions of the microwave cooking were as follows:

| Microwave energy | 2.2 kw min/lb of dough |
|---|---|
| Moisture loss | 3% by weight |
| Cooked product internal temperature | 200° F. |
| Air temperature | 250° F. |

In each instance, the baked product was cooled and comminuted to the desired crumb size. In each case, the crumb was stale, cohesive, friable and had an opaque appearance. The microwave-baked material had a white appearance and the oven-baked material a browned surface.

The properties of the products were tested and are reproduced in the following Table II:

TABLE II

| Property | Value | |
|---|---|---|
| | Microwave | Oven |
| Density (lb/cu.ft.) | 15 | 18 |
| Absorption capacity (times own weight) | 2.3 | 2.8 |
| Shear value (kg) | 49 | 38 |

Example III

Example II was repeated with the following composition:

| (a) Dry feed: | |
|---|---|
| Wheat flour | 75 lb |
| Rye flour | 25 lb |
| Shortening | 3.4 lb |
| Salt | 2.0 lb |
| (b) Yeast suspension: | |
| Yeast | 3.70 lb |
| Sugar | 0.07 lb |
| Water | 12.0 lb |
| (c) Liquid brew: | |
| Yeast food | 0.3 lb |
| Wheat flour | 10 lb |
| Rye flour | 3 lb |
| Sugar | 1.5 lb |
| Protease | 78,000 H.U. |
| Water | 34 lb |

The dry mix, brew mix and additional water were fed to one end of the extruder at the following feed rates:

| | |
|---|---|
| Dry feed | 15 lb/min |
| Water | 2.2 lb/min |
| Brew mix | 9.0 lb/min |

The extruder was operated as described in Example I, under the following conditions:

| | |
|---|---|
| Mixing time | about 28 seconds |
| Dough exit temperature | 105° F. |
| Gas inlet flow | 11 SCFH/100 lb dough |
| Work applied | 16.5 watt hr/lb dough |
| Extruder back pressure | 90 psig |

After baking the resulting dough and further processing following the procedure of Example II, the bread crumbs were tested and the properties are reproduced in the following Table III:

TABLE III

| | Value | |
|---|---|---|
| Property | Microwave | Oven |
| Density (lb/cu.ft) | 14, 2.8, 48 | 16, 3.5, 46 |
| Absorption capacity (times own weight) | 14, 2.8, 48 | 16, 3.5, 46 |
| Shear value (kg) | 14, 2.8, 48 | 16, 3.5, 46 |

Example IV

Bread crumbs of various fine mesh sizes produced by the procedure of Example II were coated on fish and the fish was fried. The fried product was adjudged in taste tests to have comparable characteristics to fried fish breaded with conventional commercial bread crumbs.

Other coarser crumbs were reconstituted with water and were found to have comparable properties to conventional commercial stuffing crumbs.

SUMMARY OF DISCLOSURE

In summary of this disclosure, the present invention provides a unique procedure for the preparation of comminuted stale bread which involves only a very short overall period of time. Modifications are possible within the scope of the invention.

What we claim is:

1. A continuous process for the manufacture of stale bread suitable for comminution to form particulated bread, which comprises:
   feeding bread-forming components including flour and water to a continuous mixing zone in quantities such that the total quantity of moisture in the bread-making components is about 38 to about 50% by weight,
   advancing the bread-forming components in plug flow manner through said mixing zone in about 20 to about 180 seconds,
   introducing at least one inert gas to said bread-forming components at a plurality of locations during the passage of said components through said zone at a gas flow rate of about 1.3 to about 30 SCFH/100 lb. of bread-forming components,
   subjecting said bread-forming components and introduced inert gas to conditions of high shear within said mixing zone such that the work done on the materials within the mixing zone varies from about 7.5 to about 20 watt hr/lb of bread-forming components to cause mixing of said components and distribution of gaseous material within the mixture,
   subjecting said bread-forming components and introduced inert gas to an elevated temperature within said mixing zone during at least a major proportion of the time of passage thereof through said mixing zone to cause partial gelation of starch material contained in said bread-forming components while also subjecting the bread-forming components to a back pressure of about 50 to about 500 psig,
   extruding dough having an internal temperature of about 90° to about 130° F. from said mixing zone, and
   substantially immediately after said extrusion, baking said extruded dough using electromagnetic radiation under conditions such as to result in a baked bread having an internal temperature of about 180° to about 215° F.

2. The process of claim 1 wherein said baking is achieved by the application of microwave radiation at an input of about 1.4 to about 9 kw min/lb of dough under air flow at a temperature of about 200° to about 500° F. for a time sufficient to achieve said internal temperature at a moisture loss of about 2 to about 20%.

3. The process of claim 1 wherein said baking is achieved using infra-red radiation at a temperature of about 375° to about 475° F. for about 15 to about 25 minutes.

4. The process of claim 1 wherein said baking is achieved using a combination of microwave radiation application followed by infra-red radiation application.

5. The process of claim 2, 3 or 4, wherein said baking is effected on a continuous basis on a continuous dough tow extruded from said mixing zone.

6. The process of claim 1, 2, 3 or 4, wherein said moisture content is about 42 to about 45% by weight.

7. The process of claim 6, wherein said mixing time is about 30 to about 60 seconds, said gas inlet rate is about 10 to about 12 SCFH/100 lb of bread-forming components, said dough temperature is about 105° to about 120° F., said work applied is about 12 to about 16 watt hr/lb, and said back pressure is about 75 to about 120 psig.

8. The process of claim 6 including comminuting said baked stale bread to particulate form as part of said continuous process.

9. The process of claim 8 wherein said bread is rapidly cooled prior to said comminution.

10. The process of claim 8 wherein said particulate form is in crouton-like size.

11. The process of claim 8 wherein said particulate form is in crumb-like size.

12. The process of claim 1 wherein said bread-forming components, exclusive of water, comprise:

| | |
|---|---|
| Flour | 100 parts by weight |
| Sugar | up to about 5% by weight of flour |
| Salt | up to about 5% by weight of flour |
| Yeast | 0 to about 4% by weight of flour |
| Mono and/or diglycerides | 0 to about 2% by weight of flour |
| Hydrolyzed wheat starch | 0 to about 5% by weight |
| Non-ionic surfactant | 0 to about 0.75% by weight |
| Shortening | 0 to about 8% by weight |

13. The process of claim 1, wherein said bread-forming components, exclusive of water, comprise:

| | | |
|---|---|---|
| Wheat flour | 75 parts by weight | |
| Rye flour | 25 parts by weight | |
| Sugar | up to about 5% by weight of total flour | |
| Salt | up to about 4% by weight of total flour | |
| Yeast | 0 to about 4% by weight of total flour | |
| Shortening | 0 to about 8% by weight of total flour | |
| Yeast food | 0.2 to about 0.32% by weight of total flour, when yeast is present | |
| Protease | about 25,000 to about 85,000 H.U./100 lb of flour, when yeast is present. | |

14. The process of claim 1 wherein a flavour-enhancing and texture-modifying premix is included in said bread-forming components in the form of concentrated brew containing a minor proportion of said flour, a major portion of said water, and partly fermented yeast, amylolytic enzyme and/or proteolytic enzyme.

15. The process of claim 14, wherein said concentrated brew is formed by:

(i) fermenting a yeast suspension comprising, based on the total weight of flour:

| | by weight |
|---|---|
| Yeast | about 2 to about 4% by weight |
| Sugar | about 0.05 to about 0.1% by weight |
| Water | about 10 to about 12% | at a temperature of about 85° to about 105° F. for about 15 to about 60 minutes, and (ii) mixing the fermented yeast suspension with a liquid enzyme mixture comprising, based on the total weight of flour:

| | |
|---|---|
| Amylolytic enzyme | about 1250 to about 6000 SKB units/100 lb. flour |
| Proteolytic enzyme | about 25,000 to about 85,000 H.U./100 lb flour |
| Yeast food | about 0.25 to about 0.32% by weight |
| Sugar | about 1 to about 5% by weight |
| Water | about 30 to about 35% by weight |
| Flour | about 5 to about 20% by weight | and fermenting the resulting brew at a temperature of about 85° to about 105° F. for about 30 to about 90 minutes, and said concentrated brew is used in conjunction with such additional water as may be required to provide the overall moisture content and with a dry mix comprising, by weight of total flour:

| | |
|---|---|
| Flour | about 80 to 95% by weight |
| Salt | about 1 to about 3.5% by weight |
| Shortening | 0 to about 8% by weight | as the bread-forming components.

* * * * *